United States Patent
Schertzinger (10) Patent No.: US 8,719,572 B2
(45) Date of Patent: May 6, 2014

(54) SYSTEM AND METHOD FOR MANAGING AUTHENTICATION COOKIE ENCRYPTION KEYS

(75) Inventor: Jeremiah Paul Schertzinger, Edmonds, WA (US)

(73) Assignee: Disney Enterprises, Inc., Burbank, CA (US)

( * ) Notice: Subject to any disclaimer, the term of this patent is extended or adjusted under 35 U.S.C. 154(b) by 842 days.

(21) Appl. No.: 12/218,650

(22) Filed: Jul. 16, 2008

(65) Prior Publication Data

US 2010/0017596 A1    Jan. 21, 2010

(51) Int. Cl.
    H04L 29/06    (2006.01)

(52) U.S. Cl.
    USPC .............................................. 713/170; 726/2

(58) Field of Classification Search
    USPC ................ 713/170; 726/9, 2, 5; 380/277, 278
    See application file for complete search history.

(56) References Cited

U.S. PATENT DOCUMENTS

| | | | |
|---|---|---|---|
| 7,987,365 B2 * | 7/2011 | Birrell et al. ................... | 713/170 |
| 2003/0074580 A1 * | 4/2003 | Knouse et al. ................. | 713/201 |
| 2004/0111621 A1 * | 6/2004 | Himberger et al. ........... | 713/182 |
| 2004/0162983 A1 * | 8/2004 | Gotoh et al. ................... | 713/171 |
| 2006/0212706 A1 * | 9/2006 | Jiang et al. .................... | 713/176 |
| 2008/0256616 A1 * | 10/2008 | Guarraci et al. ................ | 726/9 |
| 2009/0232310 A1 * | 9/2009 | Holtmanns et al. ........... | 380/277 |

FOREIGN PATENT DOCUMENTS

EP    1206066 A2 *    5/2002

OTHER PUBLICATIONS

Park, et al., *Secure Cookies on the Web*, IEEE Internet Computing, pp. 36-44 (Jul.-Aug. 2000).
Barbato, et al., *SCS: Secure Cookie Sessions for HTTP draft-barbato-scs-00*, IETF Standard Working Draft (Sep. 5, 2006).
Xu, et al., *Protecting Web Usage of Credit Cards Using One-Time Pad Cookie Encryption*, IEEE, Proceedings of the 18th Annual Computer Security Applications Conference (2002).

* cited by examiner

*Primary Examiner* — Ali Abyaneh
(74) *Attorney, Agent, or Firm* — Farjami & Farjami LLP (57) ABSTRACT

There is provided a system and method for managing authentication cookie encryption keys. The system comprises a computing device including a memory with authentication data having a key identifier and encrypted data with a session identifier. The key identifier references a key having a validity period, the key capable of decrypting the authentication data. A processor of the computing device can respond to user requests for information by retrieving the authentication data and transmitting it to a server. The server can then authenticate the user by verifying the encrypted session identifier using the referenced key. There is also provided a method by which a key server can manage encryption keys. The key server receives an encryption key having a validity period, receives a validity request, confirms or rejects the validity of the encryption key, and automatically invalidates the encryption key upon expiration of the validity period.

10 Claims, 5 Drawing Sheets

SYSTEM AND METHOD FOR MANAGING AUTHENTICATION COOKIE ENCRYPTION KEYS

BACKGROUND OF THE INVENTION

1. Field of the Invention

The present invention relates generally to communications systems for transmission of data. More particularly, the present invention relates to data security.

2. Background Art

The Internet, particularly the World Wide Web (Web), has become a ubiquitous fixture in modern society. Originally, the Web consisted primarily of text documents with little to no graphics or interaction. However, as developers began introducing multimedia, interaction, and security features into the Web, it transformed into an attractive platform for both the general population as well as commercial interests. Today, many websites offer some value added service in exchange for registration, such as customization or additional features. Some examples might include tracking preferences and recommendations for an e-commerce website, the ability to communicate with other registered users on a social networking site or forum, and access to content unavailable to the general public. These services are enabled by authentication, so that the web server can differentiate and associate particular users in a consistent manner. For the user, this typically manifests in the familiar username and password login page that is often prominently displayed at the top level of many websites.

However, the tradeoff is the inconvenience of having to constantly retype the username and password to take advantage of services offered only to authenticated users. A user might simply forego these services when considering the hassle of logging into many different websites, each with their own username and password.

The users are also accustomed to seeing the "Remember Me" checkbox to help alleviate this problem. Typically, a Hypertext Transfer Protocol (HTTP) cookie provided by the web server after an initial authentication enables this functionality. This HTTP cookie contains a small amount of data and is hosted on the user computer for future retrieval by the web server. In an authentication context, the cookie acts as a substitute for the user manually typing in his or her credentials. The cookie also allows the creation of a session, so that a user does not have to keep typing in credentials for every successive page within a certain expiration period. The web server simply receives the cookie instead to authenticate the user.

Although the use of cookies makes the task of authentication simpler for the user, there are security disadvantages to this method. Since the HTTP cookie acts as a substitute for authentication, it can be used for identity theft by a malicious third party. For example, if a third party is able to access the computer with the cookie, the third party can login without giving username and password credentials. If the cookie itself is transferred in an insecure communications channel, such as an insecure wireless network, a third party might eavesdrop on the data and duplicate the cookie in an attempt to impersonate the user on the website. If the cookie further contains unencrypted data, a malicious user might attempt to create his own cookie to impersonate another user or an administrator with elevated privileges. For this reason, cookies are often transferred in an encrypted form to prevent the generation of fake cookies. For the reasons stated above, the cookie authentication method is not suitable for high security applications such as online banking. Alternatively, cookie authentication might be paired with a more secure authentication step for sensitive actions such as account management and placing an order on an e-commerce site.

One might wonder why all communications are not done in a secure channel to avoid the security issues inherent in the cookie method. Performance and complexity are the typical reasons why secure communications are not used for less critical applications, as the administrative and computational costs for supporting multiple secure users may outweigh the security benefits. Thus, an encrypted cookie coupled with an initial authentication step represents a compromise between conserving computing resources and enhancing security. This method of authentication is already employed on many websites today, but there are still significant problems remaining.

Focusing specifically on the cookie encryption step, many websites use a single symmetric encryption key that is hard-coded into the web server and never changes. A security breach or a compromised key in this case may be disastrous, requiring the manual reconfiguration of the web server. Moreover, a breach might not be detected until an inopportune time, since a compromised key might be reserved for future use due to the unchanging nature of the key. Additionally, a malicious user might stealthily gather valuable and private personal information over a long period of time without causing changes that might alert the user or the administrators of a security breach.

Accordingly, there is a need to overcome the drawbacks and deficiencies in the art by providing a way to improve the security of authentication cookie encryption keys, thus providing both convenience and security for users of cookie authenticated websites.

SUMMARY OF THE INVENTION

There are provided systems and methods for managing authentication cookie encryption keys, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for managing authentication cookie encryption keys. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
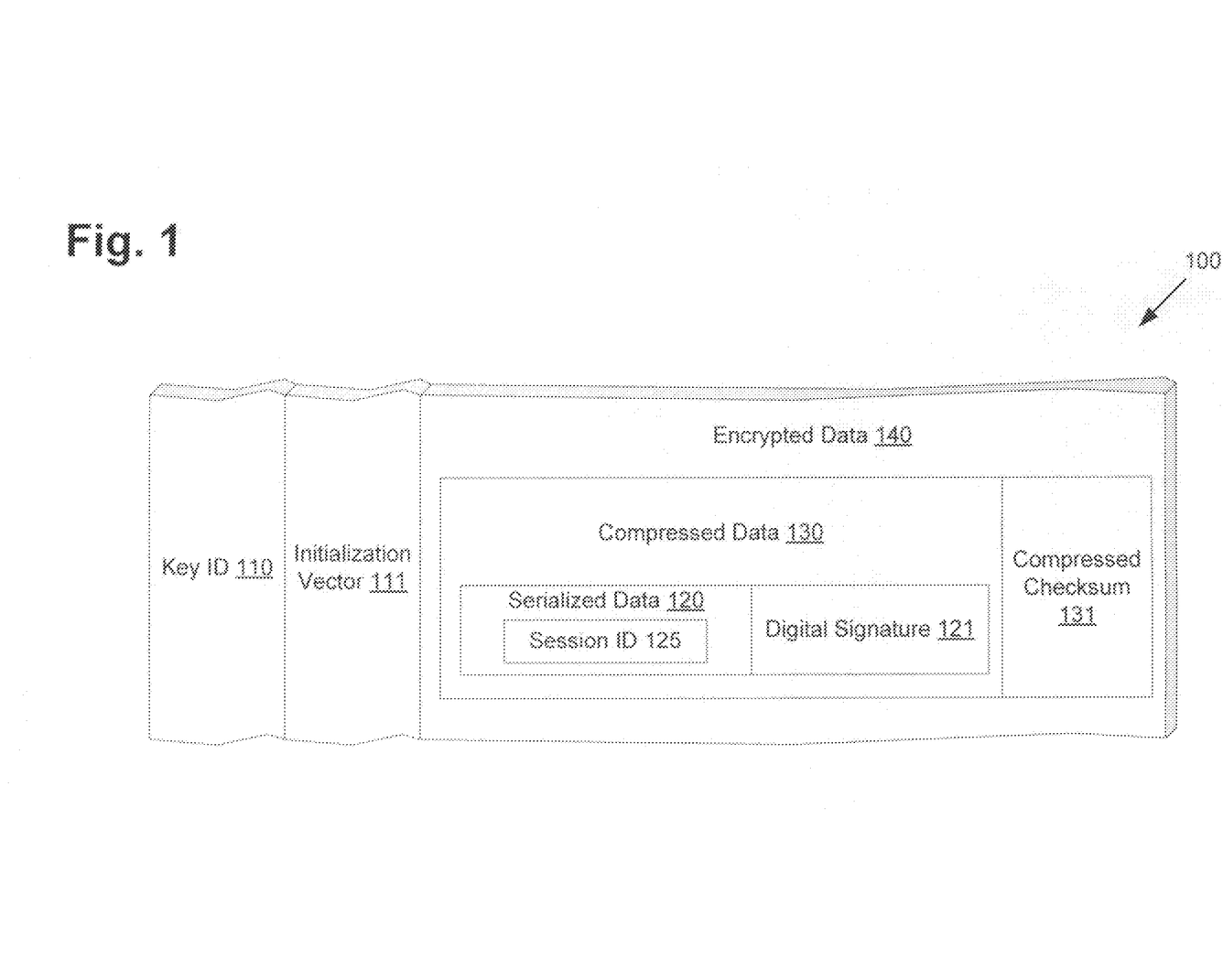
FIG. 1 presents a block diagram of an authentication cookie, in accordance with one embodiment of the present invention.

FIG. 1 presents a block diagram of an authentication cookie, in accordance with one embodiment of the present invention. Authentication cookie 100 includes key ID 110, initialization vector 111, and encrypted data 140. Encrypted data 140 includes compressed data 130 and compressed checksum 131. Compressed data 130 includes serialized data 120 and digital signature 121.

Examining FIG. 1, it may be helpful to start with the innermost blocks and work outwards. Serialized data 120 contains information concerning a user and a communications session, which acts to authenticate the user in lieu of credentials such as a username and password. The word "serialized" here simply refers to the proper formatting of the data into a standardized form. Serialized data 120 includes session ID 125 that is unique from the session ID of other cookies. Using session ID 125, a server can differentiate a particular session and its associated user from other users. When a web browser requests a web page from the server, authentication cookie 100 is provided to the server as a matter of course, enabling the server to read and confirm session ID 125. Besides the session ID, serialized data 120 might additionally include user preferences and other session data that the server can use.

Digital signature 121 is a digital signature of serialized data 120. As the name implies, digital signature 121 provides some assurance that the entity generating the cookie is really the entity it claims to be. To generate digital signature 121, serialized data 120 might be hashed, and then the resulting hash digest might be encrypted with a private key associated with a public key certificate previously signed and issued to the entity by a trusted third party. A number of different hash algorithms might be used, such as a variant of the Secure Hash Algorithm (SHA). Parties interested in verifying the signature can decrypt the hash digest using the public key certificate issued by the trusted third party and compare it to a calculated hash on serialized data 120. If the hash values match, then assuming the trusted third party is trustworthy, the identity of the entity can be independently verified. This digital signature provides additional security against unauthorized third party attacks, as a potential attacker will need access to both the digital signature private key and the authentication cookie encryption key to forge a validly signed cookie.

Compressed data 130 includes serialized data 120 and digital signature 121. To generate compressed data 130, a compression algorithm is applied to the raw uncompressed data. For example, the widely used zlib library implementing the deflate algorithm might be used. This allows the data to occupy less disk space than in uncompressed form. Since most modern web browsers limit the maximum size of cookies for a particular domain to a small size, typically 4 (four) kilobytes, it may be prudent to minimize the size of the cookie. Additionally, due to the addition of a compressed checksum 131, an application can verify the data is intact and without transmission errors.

Encrypted data 140 includes compressed data 130 and compressed checksum 131. An encryption algorithm such as a variant of the Advanced Encryption Standard (AES) might be used to encrypt with a single symmetric key. This symmetric key acts as the authentication cookie encryption key, capable of both encrypting and decrypting. Since the key is also capable of encrypting messages, it should be safeguarded from users and third parties who might try to forge cookies with it.

Alternatively, encrypted data 140 might be encrypted using an asymmetric private key, and decrypted using a matching asymmetric public key. This allows the encryption and decryption privileges to be controlled based on access to the private and public keys, respectively. Generally, this split of privileges is used to implement authentication features such as digital signatures. However, this additional flexibility adds significant computational requirements to the encryption and decryption steps. Additionally, in the present embodiment, digital signature 121 already provides a measure of authentication. Thus, for the purposes of improving computing performance in the present example, encrypted data 140 shall be encrypted with a single symmetric key.

Initialization vector 111 ensures that even if the same data is being encrypted, the resulting encrypted block is different. When generating encrypted data 140 in a block cipher, initialization vector 111 might be linearly added to each block before applying the encryption step. Similarly, when decrypting, initialization vector 111 would be linearly subtracted from each decrypted block. Alternatively, in a stream cipher, initialization vector 111 might be inserted before the actual data to be encrypted, and simply discarded during decryption. The end result is that the unencrypted data is influenced by an element of randomness, initialization vector 111, which leads to encrypted data 140 being more secure due to the added unpredictability.

If identical data results in identical encrypted data as with a simple Electronic Code Book (ECB) block cipher without an initialization vector, reverse cryptographic analysis becomes much easier for a potential attacker, weakening security. Passwords are especially vulnerable to this property, since identical passwords will yield identical encrypted data. As long as initialization vectors are unique, even identical data will result in different encrypted data, which strengthens security. Generating initialization vectors based on an incremental nonce such as a timestamp may ensure the desired uniqueness, but may weaken security since the initialization vector becomes somewhat predictable. Thus, some random or pseudo-random function with a low chance of collisions may be ideal. Since the initialization vector itself may be required for decryption and is useless without the key, it is acceptable to transfer in the clear, unencrypted.

Key ID 110 references a key having a validity period after which the key becomes invalid. The reference might refer to an index of keys in a secure database. The database might then index the keys by key ID, with fields including the actual keys, the validity period or expiration date, and the present validity status. Since the key itself should be safeguarded from end users, only a reference to the key is included in the cookie; authorized clients such as privileged web servers will be able to retrieve the actual key referenced by key ID 110.

Figure 2:
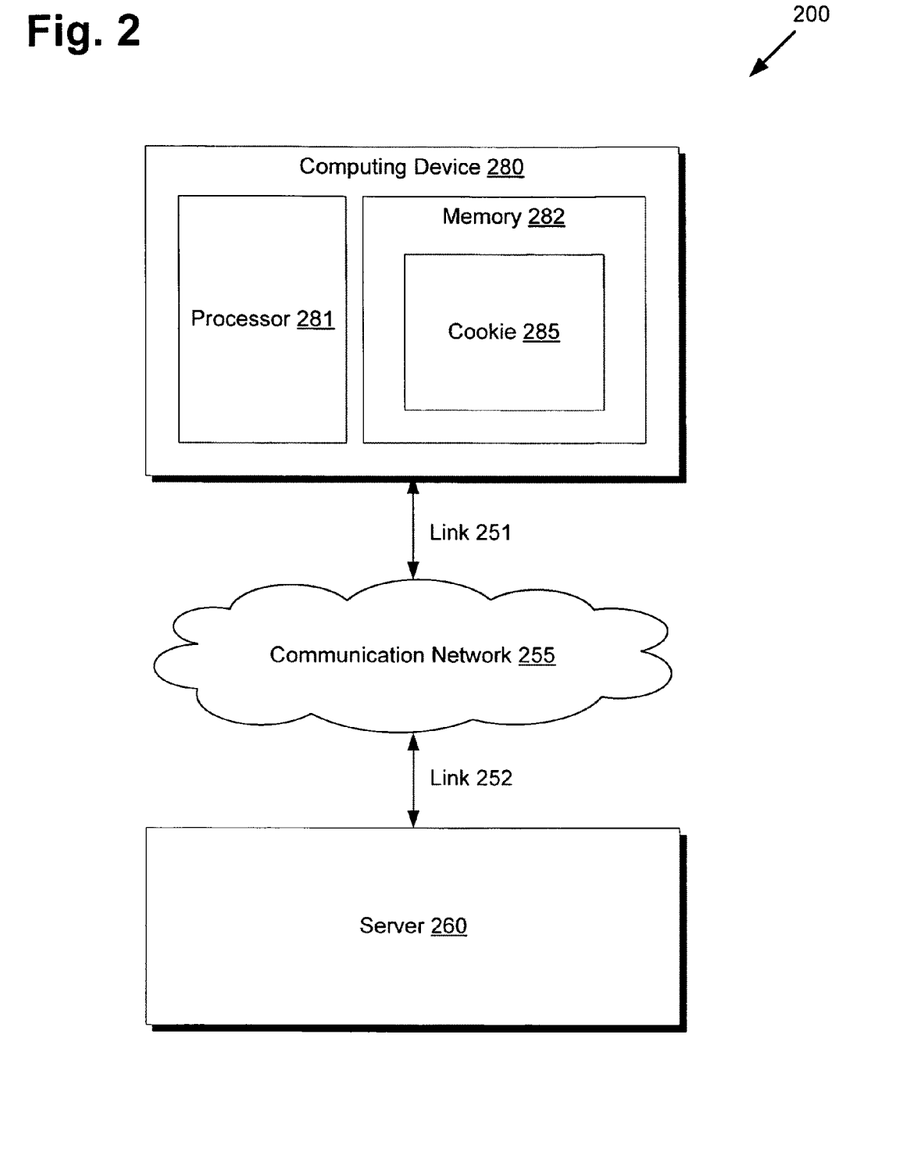
FIG. 2 presents a block diagram of a computing device providing secure data transactions, in accordance with one embodiment of the present invention.

Moving to FIG. 2, FIG. 2 presents a block diagram of a computing device providing secure data transactions, in accordance with one embodiment of the present invention.

Computing device environment 200 includes computing device 280, communication network 255, and server 260. Computing device 280 includes processor 281 and memory 282. Memory 282 includes cookie 285, which corresponds to authentication cookie 100 in FIG. 1. Computing device 280 and server 260 can communicate via communication network 255 using links 251 and 252.

Communication network 255 might represent any wide area network such as the Internet. Links 251 and 252 might be wired or wireless connections to Internet service providers. Computing device 280 might represent a number of web access enabled devices, such as a personal computer, a mobile phone, or a game console. At the minimum, processor 281 and memory 282 specify the components required of computing device 280. Memory 282 contains cookie 285 as shown; how cookie 285 is originally generated and placed in memory 282 will be discussed in further detail with FIG. 3 below.

Memory 282 can comprise volatile memory such as dynamic random access memory (DRAM), losing its contents upon the loss of power to computing device 280. In this case, cookie 285 can only persist while computing device 280 is powered on and providing power to memory 282. On the other hand, memory 282 can also comprise non-volatile memory such as flash memory or a hard disk drive (HDD). In this case, even if power is cut off from computing device 280, the contents of memory 282 including cookie 285 will persist. The decision to use volatile or non-volatile memory will thus turn on the question whether it is desirable to have a persistent cookie that can be reused in future sessions.

Figure 3:
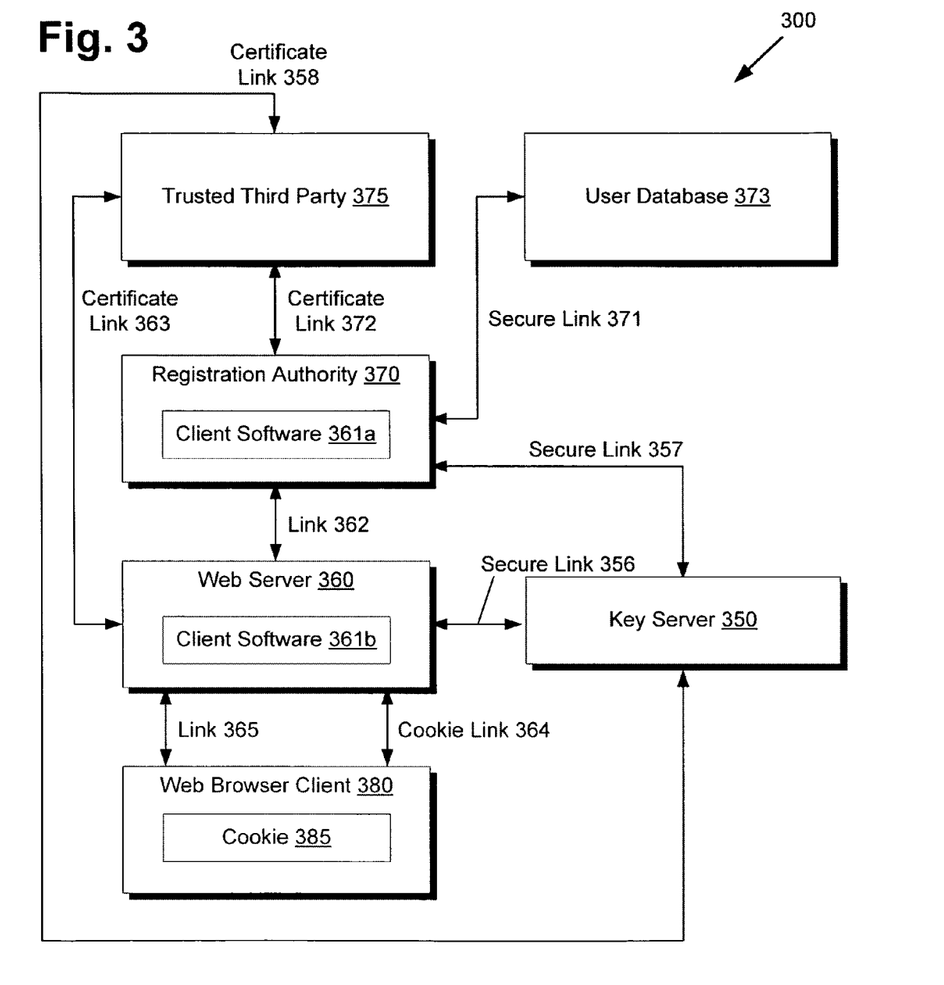
FIG. 3 presents an environment for providing secure data transactions and managing authentication cookie encryption keys, in accordance with one embodiment of the present invention.

Moving to FIG. 3, FIG. 3 presents an environment for providing secure data transactions and managing authentication cookie encryption keys, in accordance with one embodiment of the present invention. Authentication cookie encryption key management system 300 includes key server 350, web server 360, registration authority 370, user database 373, trusted third party 375, and web browser client 380. Web server 360 corresponds to server 260 from FIG. 2. Web browser client 380 corresponds to computing device 280 from FIG. 2. Web browser client 380 also includes cookie 385, which corresponds to cookie 285 from FIG. 2. Web server 360 includes client software 361a. Registration authority 370 includes client software 361b. The term "registration authority" as used here is in reference to an entity responsible for the registration of users on web servers, and not the binding of identities with public keys in a Public Key Infrastructure (PKI) as commonly used in that context. Client software 361a and 361b correspond to client software 361 from FIG. 2. Although only one web server and one web browser client are depicted in FIG. 3 for simplicity, alternative embodiments may employ many web servers and support many web browser clients.

FIG. 3 depicts numerous system communications links for data transmission. Web server 360 and registration authority 370 can communicate with key server 350 over secure links 356 and 357, respectively. Registration authority 370 can access user database 373 via secure link 371. Registration authority 370 can provide cookies to web server 360 via link 362. Web server 360 and web browser client 380 can exchange cookies via cookie link 364, and other data via link 365. Trusted third party 375 can provide certificate services via certificate links 358, 363, and 372 to key server 350, web server 360, and registration authority 370, respectively.

Although only one key server 350 is depicted in FIG. 3 for simplicity, a real world implementation may use multiple key servers to ensure minimum uptime and redundancy by eliminating a single point of failure for authentication. Thus, multiple key servers could form a key server network, synchronizing key databases with each other so that data is consistent among each key server. Methods of accomplishing this synchronization are well known in the art and thus shall not be discussed here.

Trusted third party 375 provides an important element for a PKI, enabling an authenticity verification of a digital signature. For example, registration authority 370 may wish to prove to other parties that it is indeed registration authority 370 as it claims to be. First, it might generate a public key certificate and a matching private key pair using a suitable algorithm such as Rivest Shamir Adleman (RSA). The public key certificate includes details identifying registration authority 370, such as the name, organization, location, and domain. As the name implies, the public key certificate also includes a public key, usable for decrypting digital signatures, which consist of hashes encrypted with the private key. However, the public key certificate by itself provides no guarantee that it originated from registration authority 370. Thus, registration authority 370 can submit the public key certificate to trusted third party 375 to sign and retain for future lookup by interested parties. Assuming trusted third party 375 has some kind of procedure to positively bind registration authority 370 with the identifying details in the public key certificate, trusted third party 375 can sign the public key certificate with its own private key and provide it along with its own public key to interested parties, effectively broadcasting to the world that it trusts that certificate.

For example, if web server 360 wishes to verify that an encrypted and signed cookie received from registration authority 370 was really issued by registration authority 370 and not a spoofing attacker, it can request the public key certificate of registration authority 370 from trusted third party 375, use the public key belonging to trusted third party 375 to verify the signed certificate, and use the public key in the certificate to verify the authenticity of the digital signature included in the cookie. This system relies on all parties to trust trusted third party 375 to provide correct certificates that bind public keys to the correct identities. Thus, a security breach at trusted third party 375 has obvious implications for the validity of certificates issued from it. Although this arbitrator of trust is termed a "third party," it could also be a private entity owned by the same entity as the other components of FIG. 3. "Third party" here merely indicates that it is independent from the entity generating a digital signature and the entity verifying the digital signature, or registration authority 370 and web server 360 in the present example.

With trusted third party 375 available to provide certificate authentication services for authentication cookie encryption key management system 300, the actual process of web server and web browser interaction with authentication cookies can be discussed. As previously stipulated, FIG. 3 has been simplified to represent only one web server and one web browser, or user, accessing the web server. Strictly speaking, the relationship between a web browser and a user is not always one to one, since a computer can have multiple users and multiple web browsers. However, a strict one to one relationship will be assumed to simplify the discussion. The user associated with web browser client 380 is further assumed to have previously registered with registration authority 370, resulting in user details being deposited in user database 373.

To illustrate the flow of data in FIG. 3 by way of establishing an example, web server 360 might host the company website of a videogame development company, with an optional members-only area of the site that requires registration. Registration collects some personal details from the user and relies on a user selected username and password combination for future authentication. These personal details and authentication credentials will be deposited in user database 373 after web server 360 negotiates with registration authority 370 to process the registration of the new user. Registered users might be provided a number of desirable services inaccessible to the general browsing public. For example, registered users might be enabled to access a special developer diary on the progress of the newest videogame, communicate with other registered users on a community forum, and purchase exclusive merchandise such as limited edition game prints or company branded accessories.

For the purposes of the present example, it might be convenient to personify the user as a particular individual. Glen, a rabid fan of the above videogame company, eagerly registers his user details and is duly recorded by user database 373. After registering, Glen points web browser client 380 over to web server 360, which operates the registered members only area of the videogame company site. Glen is prompted with a login screen, asking for his username and password and additionally asking him if he wants to remember his login details for the future. Glen dutifully enters in his information, username "Glen101" and password "Imthebest" and ticks the checkbox to remember his login, as he plans on visiting the website everyday on his home computer. When Glen clicks on the "login" button, a string of communications ensues.

First, the login credentials are transferred over link 365 from web browser client 380 to web server 360, using a secure method such as Secure Sockets Layer (SSL) or Transport Layer Security (TLS), for example. Web server 360 passes this information to registration authority 370 over link 362, which may again be a secure link. If, for example, web server 360 and registration authority 370 are on the same local intranet with sufficient security measures in place, link 362 might be unsecured instead to enhance performance. In either case, when registration authority 370 receives the login credentials, it will query user database 373 over secure link 371 to see if the credentials match. Secure link 371 might be implemented using SSL or Secure Shell (SSH).

Once user database 373 receives the query request, it will return the existing registered data in the database. For security purposes, user database 373 will likely only contain hashes of the password rather than the password itself. Keeping plaintext passwords in a database is especially dangerous, as users tend to use the same username and password across different websites. Since hash values are easily calculated in the hashing direction but are nearly impossible to regenerate back to the original message, a security breach of user database 373 only results in largely useless hash values for an attacker. By comparing the hash of the user credentials versus the previously generated hash in user database 373, the validity of the present login can be verified. Thus, if username "Glen101" and the hash value of "Imthebest" match the existing hash data in the database, the login credentials will be deemed valid. This hash calculation step could be conceivably calculated at user database 373, but to maintain database performance, the hash calculation will likely be processed at registration authority 370 or web server 360.

Depending on the results of the previous validation step, user database 373 will either return details about the user to registration authority 370 or provide a diagnostic error message that the username is not registered or the password is incorrect. If a diagnostic error is received, registration authority 370 can pass the error to web server 360, which can then decide how to proceed. For example, web server 360 could give a general error message such as "Username and/or password not recognized" to avoid divulging unnecessary information that might be useful to an attacker, and limit the amount of attempted logins within a certain time period to prevent brute force attacks. However, since Glen already registered, there will be no login error and personal details regarding Glen will be transferred over secure link 371 to registration authority 370.

Since registration authority 370 has the data regarding Glen stored locally, it can proceed to generate cookie 385 that will eventually be provided to web browser client 380. Referring to FIG. 1 depicting an authentication cookie once again, the personal data regarding Glen will be formatted into serialized data 120. Session ID 125 might be generated similarly to initialization vector 111 as explained above, using a nonce or a random function. Registration authority 370 might also insert other data into serialized data 120 that is not directly sourced from user database 373, such as a session expiration time. As discussed earlier, registration authority 370 will have a private key for signing and a matching public key certificate on file with trusted third party 375 over certificate link 372. By hashing serialized data 120 and signing the hash with the private key, digital signature 121 can be included. Serialized data 120 and digital signature 121 are further compressed together into compressed data 130, with compressed checksum 131 generated to verify the integrity of a future decompression.

Figure 4:
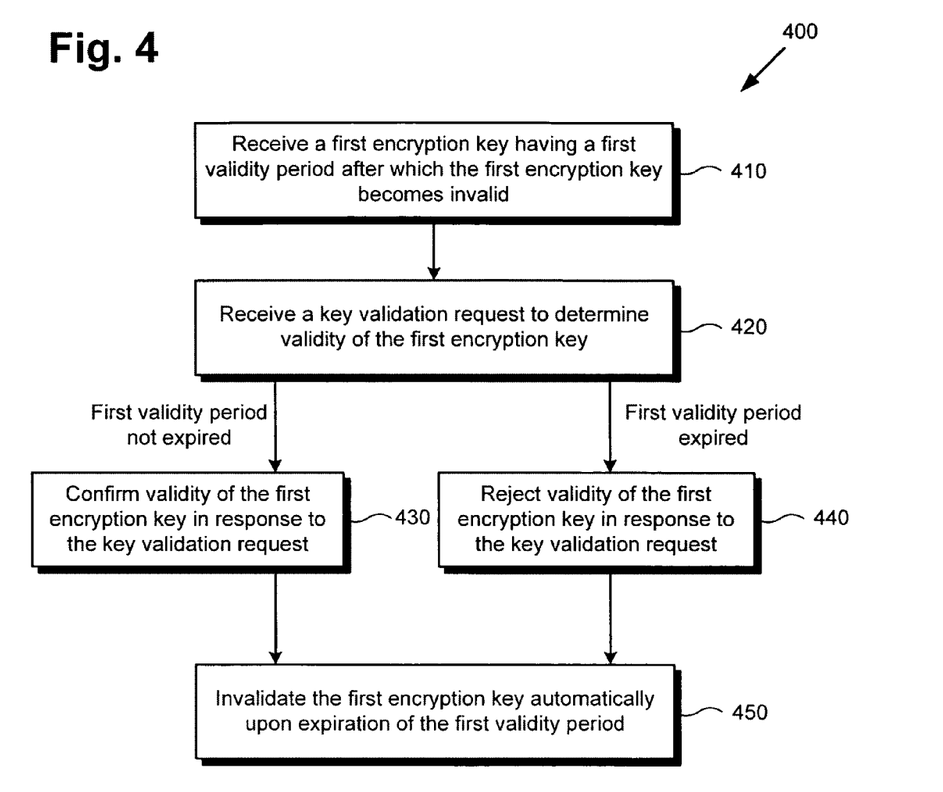
FIG. 4 shows a flowchart describing the steps, according to one embodiment of the present invention, by which a computing device can provide secure data transactions.

Now that an unencrypted but signed and compressed portion of the cookie is assembled and ready at registration authority 370, now is a good time to transition to FIG. 4, which shows a flowchart describing the steps, according to one embodiment of the present invention, by which a key server can manage encryption keys. Through the steps of flowchart 400, registration authority 370 is enabled to receive a valid encryption key for encrypting the unencrypted portion of the cookie. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and authentication cookie encryption key management system 300 of FIG. 3, step 410 of flowchart 400 comprises key server 350 receiving a first encryption key having a first validity period after which the first encryption key becomes invalid. In other words, the first encryption key has an expiration date. Although registration authority 370 might provide this first encryption key over secure link 357, key server 350 might also self-generate this first encryption key as well, providing the key to itself.

For the present example, assume that key server 350 already has two keys in its local key database, key A and key B. Key A has been prematurely expired by an administrator due to concerns of a potential security breach. Key B is still valid, but the validity period is scheduled to expire soon. Therefore, key server 350 generates and receives a new key, key C, with a first validity period set to expire much later than key B. As previously mentioned, this key C might also be received from registration authority 370 instead. Key C might be generated using a pseudo-random number generator, or a true random number generator that leverages random electrical noise, for instance. Since key C is generated before key B expires, clients that are still using key B for existing sessions can continue to use key B until the new key C is distributed. In this manner, key server 350 enables the changing of keys with overlapping validity periods, or in other words a key change transition period. This enhances security due to the constantly changing keys, as opposed to a static hardcoded key that never expires.

The majority of end users will not be inconvenienced by this user-transparent key change, since sessions still using old keys will continue to be valid during the key change transition period. With a transition period configured to comfortably exceed the average maximum length of a typical session, a majority of end users can be migrated to key C without being prompted to verify their authentication credentials again due to key B expiring in the middle of a session using key B. For those few users that are prompted to login again, it may not be too burdensome to require a new login since their session times are significantly longer than the average.

After key C is generated, key server 350 might automatically push key C to registration authority 370 and web server 360 for caching purposes. Alternatively, key server 350 might wait for key pull requests from registration authority 370 and web server 360. These key pull requests might be done on demand or periodically. A combination of the push and pull methods might also be used in an attempt to reach as many clients as possible.

Moving to step 420, key server 350 receives a key validation request from registration authority 370 to determine the validity of key C. This key validation request could also originate from web server 360. Key server 350 will consult its local key database to determine whether key C has been prematurely expired or temporarily suspended due to security concerns. Assuming the database indicates key C is still valid, key server 350 will further check the current date and time against the key validity period to make sure it is still valid. Since this time check requires an accurate time to work optimally, key server 350 might synchronize against an external time server to compensate for drifting or inaccurate time.

Depending on the result of step 420, key server 350 will either confirm the validity of key C as in step 430, or reject the validity of key C as in step 440, depending on whether the validity period has not expired or has expired, respectively. In either case, the result will be provided as a response to registration authority 370, the original validity requester. Since key C was just recently created, the result might be assumed to be a confirmed validity, in which case step 430 will be executed instead of step 440.

Besides being received on demand, step 420 might occur on a predetermined interval automatically, as mentioned above with the automatic key pull requests. A client software executing on registration authority 370 might be configured to request new key status from key server 350 on a set interval, caching the key status between intervals. This interval might be set long enough to prevent wasted server and network resources but short enough to ensure reasonably updated key information at each client. Each client that requests from key server 350 might retrieve a set of keys dedicated to the particular client only, preventing one key leak from compromising all other clients. Alternatively, each client or a certain group of clients might share the same set of keys for efficiency or interoperability of cookies across different domains. As previously discussed, key validity periods may be timed to have an overlapping transition period of key validity rather than abruptly changing, allowing existing sessions to continue authenticating using old keys so that users do not experience interruptions in service. In this manner, computational security might be more confidently maintained and possible damage caused by a compromised key might be mitigated.

"Computational security" refers to the concept that it is impractical to brute force a valid key within a certain time period due to limitations of modern processing power and cryptographic analysis. However, as computing power increases and cryptographic attacks become more sophisticated, this computationally secure time window may shrink smaller and smaller into the future. On the other hand, advanced computing power and new cryptography algorithms may also permit stronger cryptographic keys and strengthen resistance against brute force attacks, so the benefits can accrue to both attacking and defending sides. As these variables fluctuate into the future, site administrators can adjust the key validity period to take into consideration these new trends in cryptography.

At step 450, key server 350 will invalidate key C automatically upon expiration of the first validity period. If nothing noteworthy happens to key C security-wise, this expiration will coincide with the originally established first validity period. However, as previously mentioned, keys might potentially be prematurely expired or temporarily suspended due to security concerns. For example, a third party attacker might compromise a web server containing a local copy of key C. If server administrators are not sure that key C was really leaked, they might instruct key server 350 to temporarily suspend the validity of key C until further investigation. Upon doing log analysis or other detective work, if it appears key C is still private from malicious third parties, key server 350 might be instructed to revalidate key C. On the other hand, if the administrators want to err on the safe side, they may permanently invalidate key C by changing the expiration date such that key C will expire immediately. For the present example, it will be assumed that key server 350 will expire key C as originally scheduled by the first validity period.

Now that registration authority 370 has a local copy of key C including its validity period, and key server 350 just asserted that key C is still valid in step 430, registration authority 370 is ready to encrypt with key C for the unencrypted portion of the cookie. Referring again to FIG. 1, encrypted data 140 is generated by encrypting the compressed and signed cookie data using key C and initialization vector 111. Key ID 110 will contain some pointer or reference that indicates that key C is the particular key being used, and initialization vector 111 will be some iterative or random number as noted in the discussion above. After some transformations to conform to character and formatting limitations of a plaintext cookie, the authentication cookie will be fully assembled and ready to transfer to web server 360 over link 362. Although link 362 might be configured as a secure link, the cookie already has a number of security features built into it such as the encryption and the digital signature. Only the key ID and the initialization vector are plainly visible, which are of limited use to an attacker in isolation.

Since the request for Glen's personal details came from web server 360, registration authority 370 will provide cookie 385 representing Glen's session to web server 360. As shown by secure link 356, web server 360 also has independent access to key server 350, as web server 360 will need access to the encryption keys to manipulate the cookie. Link 362 will not be used to transfer keys from registration authority 370, since link 362 might be insecure, preventing web server 360 from confirming that the received keys are legitimate. Thus, in a similar process as with registration authority 370, web server 360 may query key server 350 for key validity and receive new keys. Assuming this happens, web server 360 should also receive a copy of key C, enabling it to decrypt and encrypt the cookie as well, although the cookie portion generated by registration authority 370 will be protected against modification due to the presence of digital signature 121.

Due to performance concerns, it may be undesirable to query key server 350 every time the validity of a key needs to be confirmed. Transferring data over network links to support these validity queries may often be expensive in terms of network and computing resources, particularly when some characteristic of the network links incurs some performance penalty. This is especially true with secure links 356 and 357, which require additional processing overhead versus plain unencrypted links. These secure links should only be used as necessary to balance performance. Therefore, registration authority 370 and web server 360 might cache their local copies of the keys and their associated validity status for a period of time between queries to key server 350. This period of time can be adjusted to ensure reasonably updated key information while providing responsive performance for clients and end-users. Additionally, similar to the storage of cookie 285 in memory 282 from FIG. 2, the local key cache might be stored in volatile storage such as DRAM, or on non-volatile storage such as a HDD. A volatile storage may improve security against a security breach or physical theft as the keys will be deleted after power is removed from the client. A non-volatile storage may improve uptime and availability to users since a power outage will not clear the cache. Again, the balancing of security versus availability may drive the choice here.

Now that web server 360 has the cookie and the key, it can decrypt the cookie to yield compressed data 130 and compressed checksum 131 as in FIG. 1. By calculating a checksum from compressed data 130 and comparing the checksum to compressed checksum 131, web server 360 can verify the integrity of the data. Should the checksums disagree, web server 360 will need to discard the invalid data and request retransmission of a valid cookie from registration authority 370. If the checksums do match, then web server 360 can proceed to decompress the data.

At this point, the plain unencrypted data, serialized data 120, is available for use by web server 360. However, there is no guarantee that a third party attacker did not steal key C, generating his own valid cookie and manipulating link 362 to insert a fake cookie. Fortunately, the additional presence of digital signature 121 as in FIG. 1 prevents these kinds of attacks from succeeding by positively identifying the data source. This may be especially important if web server 360 handles sensitive personal details or is capable of initiating actions affecting the finances or privacy of the user. Confirming the identity of the cookie source may thus be prudent policy for Glen's account, since his registered account is capable of shopping at the videogame company store and posting public messages on the discussion forum.

Referring again to FIG. 3, certificate link 363 provides web server 360 the means to communicate with trusted third party 375. Should web server 360 decide to verify the digital signature, it might request from trusted third party 375 the public key certificate corresponding to registration authority 370. Referring to FIG. 1, once web server 360 receives the public key certificate, it can use the embedded public key to decrypt digital signature 121 in the cookie. Web server 360 will further calculate the hash value for serialized data 120 and compare the hash to decrypted digital signature 121. If the values match, then web server 360 can verify that the party described in the public key certificate matches the issuer of the cookie, or that registration authority 370 did indeed generate the cookie in the first instance. Since this signature verification step necessarily consumes additional server and network resources, it might be skipped in lower security applications where an authenticated user has limited opportunities for conducting fraudulent or other damaging activity.

Now that web server 360 is assured that the cookie is authentic, it can proceed to actually use the data contained in serialized data 120 from FIG. 1. As mentioned, this data will include personal data regarding Glen and might also include various session and customization variables. Web server 360 might append additional local data fields and generate a new authentication cookie, although digital signature 121 will only remain valid for the original serialized data 120 generated by registration authority 370, resulting in a split cookie format. Alternatively, web server 360 might use a separate independent cookie for local variables. The separate cookie may or may not be encrypted depending on the sensitivity of the information being stored. For example, if the separate cookie merely contains visual layout preferences such as color schemes, it might be stored unencrypted since there is no value for a third party attacker.

Figure 5:
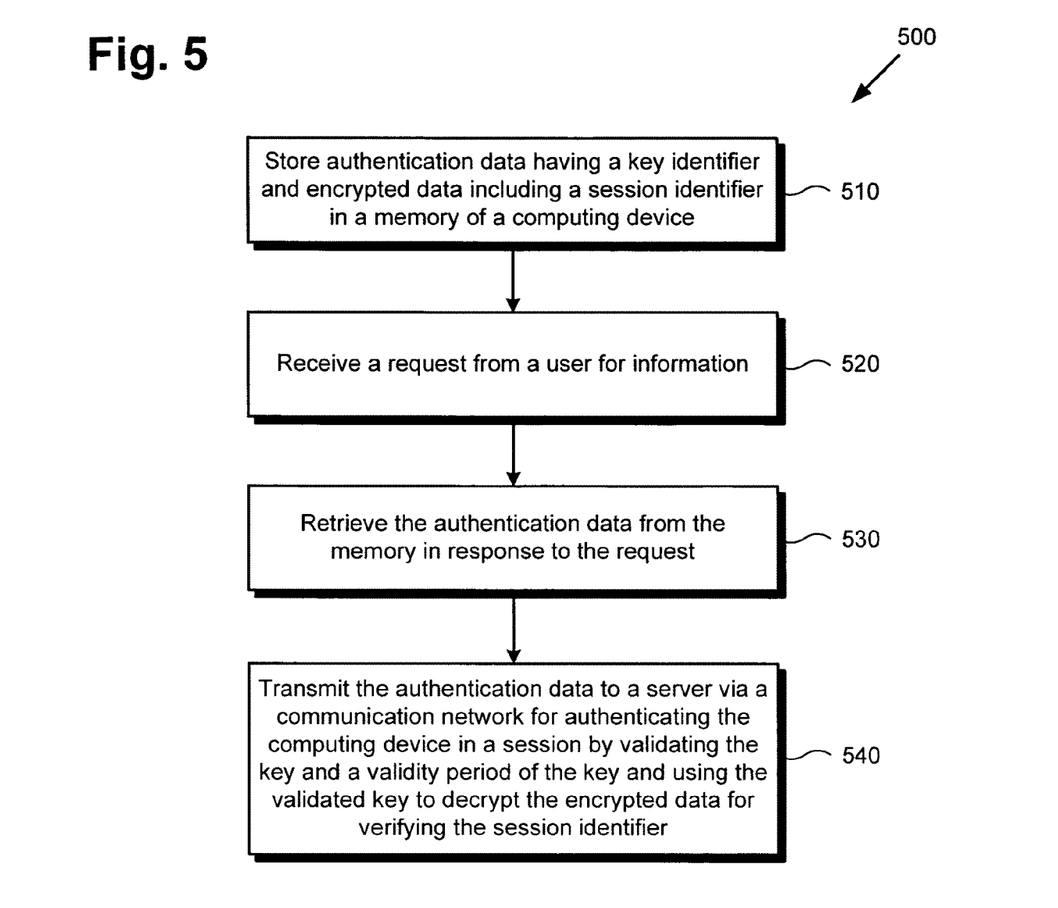
FIG. 5 shows a flowchart describing the steps, according to one embodiment of the present invention, by which a key server can manage encryption keys.

Now that web server 360 has the cookie ready, now is a good time to focus on the interactions between web server 360 and web browser client 380. FIG. 5 shows a flowchart describing the steps, according to one embodiment of the present invention, by which a computing device can provide secure data transactions. Through the steps of flowchart 500, a processor embedded in web browser client 380 can provide secure data transactions with web server 360. Certain details and features have been left out of flowchart 500 that are apparent to a person of ordinary skill in the art. For example, a step may comprise one or more substeps or may involve specialized equipment or materials, as known in the art. While steps 510 through 540 indicated in flowchart 500 are sufficient to describe one embodiment of the present invention, other embodiments of the invention may utilize steps different from those shown in flowchart 500.

Referring to step 510 of flowchart 500 in FIG. 5 and authentication cookie encryption key management system 300 of FIG. 3, step 510 of flowchart 500 comprises the processor of web browser client 380 storing cookie 385 in a memory, cookie 385 having key ID 110 and encrypted data 140 including session ID 125 as shown in FIG. 1. Web server 360 provides cookie 385 to web browser client 380 after Glen successfully logs in. Thereafter, web browser client 380 will automatically retransfer the cookie back to web server 360, without examining its contents or modifying it in any way. This is why the term "cookie" is used from the term "magic cookie," because for the recipient, in this case web browser client 380, the cookie is just a meaningless token to be returned to the issuer for authentication. An analogy might be the number on a token given for valet parking. The number has no meaning for a car driver, but still allows the car driver to authenticate his identity to the valet. Similarly, cookie 385 has no meaning to web browser client 380 since it is an encrypted block of data and web browser client 380 has no access to the associated key, but it still allows web browser client 380 to prove its identity by simply passing cookie 385 back to web server 360.

Thus, web server 360 is able to initiate a session with web browser client 380, representing Glen's home computer. The session is initiated by providing cookie 385 to web browser client 380 over cookie link 364. As mentioned with link 362, the security of cookie link 364 may be less important since cookie 385 has built in security features, but a secure channel may be still desirable to thwart certain kinds of attacks such as replay attacks. However, since the cookie authentication method is generally used to avoid the performance penalties of secure channels and server side sessions, cookie link 364 might remain as an insecure link. Additional precautions such as IP address tracking and automatic session timeout may mitigate some of the security issues resulting from using an insecure link.

Recalling back to the original login page, Glen checked the box indicating to remember his login details for future visits. This is related to cookie persistence, or how long the cookie will be stored on web browser client 380. Recall that it was said that the memory used for storing the cookie could be volatile or non-volatile. Since Glen anticipates visiting web server 360 multiple times, he does not want to be bothered entering his username and password repeatedly. Therefore, web server 360 can indicate that the cookie be persistent or non-volatile, remaining on the user's computer even after web browser client 380 is closed. When Glen wishes to login at a future date, the cookie can act as the authenticator, rather than the username and password.

Although the present example depicts only one web server 360, there may be applications where multiple web servers on different domains can share the same authentication cookie, allowing for hassle free login across a wide range of websites that are administered or owned by the same party. This could encourage cross-site exploration and promotion of related websites owned by the same entity, as login hassles are minimized using the cookie authentication system. With only a single login action, a user could potentially access the registered areas of multiple websites across different domains.

Since the cookie essentially substitutes for the username and password, username and password authentication might be requested again for particularly sensitive areas of the website such as e-commerce orders. For example, if Glen visited the website on his laptop instead, and the laptop was stolen, there would be no automatic way to discern that the laptop was stolen and the stored cookie on the laptop would still grant full privileges to the thief. Requesting authentication again for sensitive areas may limit the damage a potential thief may cause.

Continuing with step 520 of flowchart 500 in FIG. 5, step 520 comprises the processor of web browser client 380 receiving a request from Glen for information. This might constitute a click on an interactive component on the webpage displayed on the web browser. For example, there might be a banner graphic on the top of the webpage promoting a new videogame. If Glen decides to click on the banner, it constitutes a request from the user, Glen, for more information concerning the new videogame.

At step 530 of flowchart 500, the processor of web browser client 380 retrieves cookie 285 from memory 282 in response to step 520. If memory 282 comprises a HDD, this step would involve reading the cookie from the HDD. If memory 282 comprises DRAM, this step would involve reading the cookie from the DRAM. Regardless of what memory 282 is, the processor of web browser client 380 will read cookie 285 at this step.

At step 540 of flowchart 500, the processor of web browser client 380 transmits cookie 385 over cookie link 364 to web server 360, supported by a network such as the Internet. At web server 360, key ID 110 is referenced at key server 350, validating the encryption key associated with cookie 385, including its validity period. If there are no problems with the key, it is used to decrypt cookie 385 to verify session ID 125. If the session ID is the expected number from the session, web server 360 can verify that it is communicating with an authenticated web browser client 380.

As described in the foregoing, a system and method for managing authentication cookie encryption keys supports high performance client-side authentication via encrypted cookies but allows flexible key administration to improve security. Keys can be periodically changed and invalidated automatically and on demand, allowing administrators to respond to security threats in an efficient and convenient manner without manually reconfiguring multiple clients. Thus, end users enjoy the same responsiveness they expect from their favorite websites, but with enhanced security to protect their valuable personal data. Administrators also benefit from a cohesive security system capable of tracking and compensating for advances in cryptography without manual reconfiguration of all affected sites.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A computing device providing secure data transactions, the computing device comprising:
    a memory including session authentication data having a key identifier, an initialization vector, an encrypted digital signature, and encrypted data with a session identifier, wherein the key identifier references a key having a validity period after which the key becomes invalid, the session authentication data neither including the key in an encrypted form nor including the key in an unencrypted form;
    a processor in communication with the memory, the processor configured to:
        receive a request from a user for information;
        retrieve the session authentication data from the memory in response to the request; and
        transmit the session authentication data to a web server via a communication network for authenticating the computing device in a session by validating the key and the validity period of the key and using the validated key to decrypt the encrypted data for verifying the session identifier, wherein the encrypted digital signature is used to verify an entity generating the session authentication data;
    wherein the session authentication data is a Hypertext Transfer Protocol (HTTP) cookie received from the web server, and wherein the cookie is further configured to authenticate the computing device on additional web servers serving different domains than the web server.

2. The computing device of claim 1, wherein the memory is non-volatile and retains the session authentication data for a future session.

3. The computing device of claim 1, wherein the encrypted data is encrypted using a symmetric encryption key.

4. The computing device of claim 1, wherein the session authentication data is generated by a registration authority configured to:
    retrieve user details from a user database;
    generate the initialization vector;
    generate the session authentication data, including the user details in the encrypted data portion, using the initialization vector;
    insert the initialization vector into the session authentication data; and
    provide the session authentication data to the web server.

5. The computing device of claim 4, wherein the registration authority is further configured to digitally sign a portion of the data within the encrypted data.

6. A method for use by a computing device for securing data transactions, the method comprising:
- storing session authentication data having a key identifier, an initialization vector, an encrypted digital signature, and encrypted data including a session identifier in a memory of the computing device, wherein the key identifier references a key having a validity period after which the key becomes invalid, the session authentication data neither including the key in an encrypted form nor including the key in an unencrypted form;
- receiving a request from a user for information;
- retrieving the session authentication data from the memory in response to the request;
- transmitting the session authentication data to a web server via a communication network for authenticating the computing device in a session by validating the key and the validity period of the key and using the validated key to decrypt the encrypted data for verifying the session identifier, wherein the encrypted digital signature is used to verify an entity generating the session authentication data;
- wherein the session authentication data is a Hypertext Transfer Protocol (HTTP) cookie received from the web server, and wherein the cookie is further configured to authenticate the computing device on additional web servers serving different domains than the web server.

7. The method of claim 6, wherein the memory is non-volatile and retains the session authentication data for a future session.

8. The method of claim 6, wherein the encrypted data is encrypted using a symmetric encryption key.

9. The method of claim 6, wherein the registration authority is further configured to:
- retrieve user details from a user database;
- generate the initialization vector;
- generate the session authentication data, including the user details in the encrypted data portion, using the initialization vector;
- insert the initialization vector into the session authentication data; and
- provide the session authentication data to the web server.

10. The method of claim 9, wherein the registration authority is further configured to digitally sign a portion of the data within the encrypted data.

* * * * *